(12) United States Patent
Hellwig et al.

(10) Patent No.: US 8,268,461 B1
(45) Date of Patent: Sep. 18, 2012

(54) PATTERNED PERPENDICULAR MAGNETIC RECORDING MEDIUM WITH ULTRATHIN OXIDE FILM AND REDUCED SWITCHING FIELD DISTRIBUTION

(75) Inventors: Olav Hellwig, San Jose, CA (US); Ernesto E. Marinero, Saratoga, CA (US); Dieter K. Weller, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 35 days.

(21) Appl. No.: 13/049,124

(22) Filed: Mar. 16, 2011

(51) Int. Cl.
*G11B 5/66* (2006.01)
(52) U.S. Cl. ........................................................ 428/831
(58) Field of Classification Search .................. None
See application file for complete search history.

(56) References Cited

U.S. PATENT DOCUMENTS

| | | | |
|---|---|---|---|
| 7,713,389 B2 | 5/2010 | Marinero | |
| 7,722,967 B2 | 5/2010 | Marinero et al. | |
| 2008/0292907 A1* | 11/2008 | Berger et al. | 428/828 |
| 2009/0168241 A1* | 7/2009 | Mochizuki et al. | 360/125.03 |
| 2009/0213497 A1 | 8/2009 | Ono et al. | |
| 2009/0257147 A1* | 10/2009 | Ajan | 360/125.02 |
| 2010/0239888 A1* | 9/2010 | Uchiyama et al. | 428/815 |
| 2011/0164336 A1* | 7/2011 | Hirayama et al. | 360/135 |
| 2012/0045662 A1* | 2/2012 | Zou et al. | 428/810 |

OTHER PUBLICATIONS

Tagawa Et al., "Relationships between high density recording performance and particle coercivity distribution," IEEE Transactions on Magnetics, vol. 27, No. 6, Nov. 1991, 4975-4977.

* cited by examiner

*Primary Examiner* — Holly Rickman
(74) *Attorney, Agent, or Firm* — Thomas R. Berthold

(57) ABSTRACT

A patterned perpendicular magnetic recording disk has a Co-alloy recording layer patterned into discrete data islands arranged in concentric tracks and exhibits a narrow switching field distribution (SFD). The disk includes a substrate, a NiTa alloy planarizing layer on the substrate, a nonmagnetic Ru-containing underlayer on the planarizing layer, an oxide-free Co alloy magnetic recording layer, and an ultrathin oxide film between the Ru-containing layer and the Co-alloy magnetic recording layer. The oxide film may be an oxide selected from a Ta-oxide, a Co-oxide and a Ti-oxide, and is ultrathin so that it may be considered a discontinuous film. The planarizing layer and ultrathin oxide film improve the growth homogeneity of the Co-alloy recording layer, so that the patterned disk with data islands shows significantly reduced SFD.

21 Claims, 7 Drawing Sheets

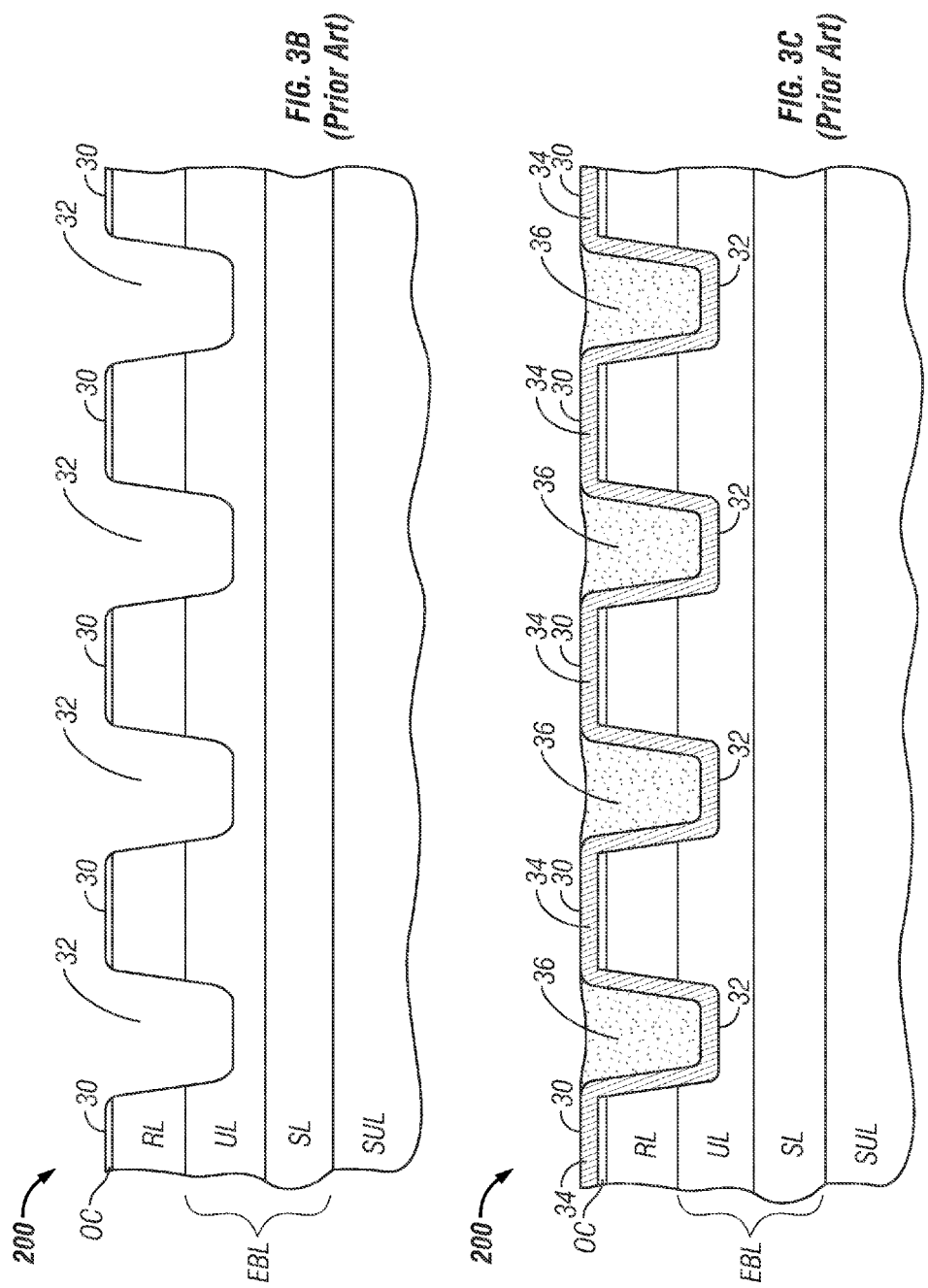

PATTERNED PERPENDICULAR MAGNETIC RECORDING MEDIUM WITH ULTRATHIN OXIDE FILM AND REDUCED SWITCHING FIELD DISTRIBUTION

BACKGROUND OF THE INVENTION

1. Field of the Invention

This invention relates generally to patterned perpendicular magnetic recording media, such as disks for use in magnetic recording hard disk drives, and more particularly to patterned disks with data islands having improved magnetic recording properties.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned media (BPM), the magnetic recording layer on the disk is patterned into small isolated data islands arranged in concentric data tracks. While BPM disks may be longitudinal magnetic recording disks, wherein the magnetization directions are parallel to or in the plane of the recording layer, perpendicular magnetic recording disks, wherein the magnetization directions are perpendicular to or out-of-the-plane of the recording layer, will likely be the choice for BPM because of the increased data density potential of perpendicular media. To produce the magnetic isolation of the patterned data islands, the magnetic moment of the spaces between the islands is destroyed or substantially reduced to render these spaces essentially nonmagnetic. Alternatively, the media may be fabricated so that there is no magnetic material in the spaces between the islands.

Nanoimprint lithography (NIL) has been proposed to form the desired pattern of islands on BPM disks. NIL is based on deforming an imprint resist layer by a master template or mold having the desired nano-scale pattern. The master template is made by a high-resolution lithography tool, such as an electron-beam tool. The substrate to be patterned may be a disk blank with the magnetic recording layer, and any required underlayers, formed on it as continuous layers. Then the substrate is spin-coated with the imprint resist, such as a thermoplastic polymer, like poly-methylmethacrylate (PMMA). The polymer is then heated above its glass transition temperature. At that temperature, the thermoplastic resist becomes viscous and the nano-scale pattern is reproduced on the imprint resist by imprinting from the template at a relatively high pressure. Once the polymer is cooled, the template is removed from the imprint resist leaving an inverse nano-scale pattern of recesses and spaces on the imprint resist. As an alternative to thermal curing of a thermoplastic polymer, a polymer curable by ultraviolet (UV) light, such as MonoMat available from Molecular Imprints, Inc., can be used as the imprint resist. The patterned imprint resist layer is then used as an etch mask to form the desired pattern of islands in the underlying magnetic recording layer.

A critical issue for the development of BPM is that the switching field distribution (SFD), i.e., the island-to-island variation of the coercive field, needs to be narrow enough to insure exact addressability of individual islands without over-writing adjacent islands. Ideally the SFD width would be zero, meaning that all the bits would switch at the same write field strength. There are extrinsic contributions to the SFD, including variations in the size, shape and spacing of the islands, and dipolar interactions between adjacent islands, as well as intrinsic contributions, including variations in the composition and crystallographic orientation of the magnetic material, which result in variations in the magnetic anisotropy of the islands. Additionally, it has been found that the SFD broadens (that is, the bit-to-bit variation in the coercive field increases) as the size of the magnetic islands is reduced, which limits the achievable bit areal density of BPM.

What is needed is a patterned perpendicular magnetic recording medium that has a narrow SFD.

SUMMARY OF THE INVENTION

The invention relates to a patterned perpendicular magnetic recording disk with a Co-alloy recording layer and a narrow SFD, and a disk drive incorporating the disk. The disk includes a substrate, an optional soft underlayer (SUL) of soft magnetically permeable material on the substrate, a planarizing layer on the substrate or optional SUL, a nonmagnetic Ru-containing underlayer on the planarizing layer, a perpendicular magnetic recording layer of a Co alloy that preferably contains no oxides, and an ultrathin oxide film between the Ru-containing layer and the Co-alloy magnetic recording layer. The recording layer is patterned into discrete islands arranged in concentric tracks. An optional NiW alloy seed layer may be located on the planarizing layer below and in contact with the Ru-containing underlayer. The planarizing layer is preferably a NiTa alloy with a thickness preferably greater than 20 nm, but if the optional SUL is present between the substrate and the planarizing layer, the planarizing layer can have a thickness between about 2 to 10 nm. The oxide film may be an oxide selected from a Ta-oxide, a Co-oxide and a Ti-oxide and having a thickness less than or equal to 1.5 nm. In this thickness regime, the oxide film thickness may be considered an "average" thickness of a discontinuous film, so that the surface onto which the Co-alloy magnetic recording layer is deposited may be both the Ru-containing layer and clusters or regions of the oxide film. The planarizing layer and ultrathin oxide film improve the growth homogeneity of the Co-alloy recording layer, so that a BPM with data islands according to the invention shows significantly reduced SFD.

For a fuller understanding of the nature and advantages of the present invention, reference should be made to the following detailed description taken together with the accompanying figures.

BRIEF DESCRIPTION OF THE DRAWING

FIGS. 3A-3C are sectional views of a BPM disk at various stages of etching and planarizing the disk according to the prior art.

DETAILED DESCRIPTION OF THE INVENTION

Figure 1:
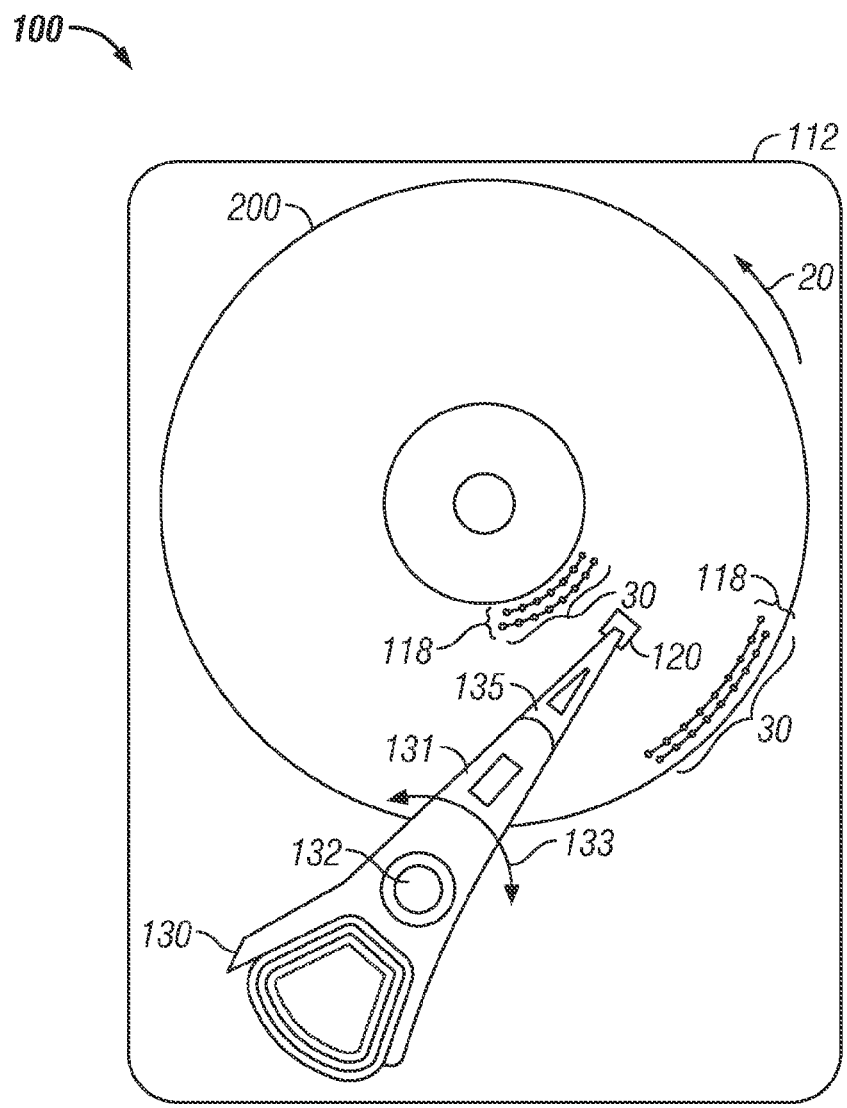
FIG. 1 is a top view of a perpendicular magnetic recording disk drive with bit-patterned media (BPM) and shows the patterned data islands arranged in concentric circular data tracks according to the prior art.

FIG. 1 is a top view of a patterned-media magnetic recording disk drive 100 with a patterned-media magnetic recording disk 200. The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and read/write head associated with each surface of each disk.

The patterned-media magnetic recording disk 200 includes a hard or rigid disk substrate and discrete data islands 30 of magnetizable material on the substrate. The data islands 30 are arranged in radially-spaced circular tracks 118, with only a few islands 30 and representative tracks 118 near the inner and outer diameters of disk 200 being shown in FIG. 1. The islands 30 are depicted as having a circular shape but the islands may have other shapes, for example generally rectangular, oval or elliptical. As the disk 200 rotates in the direction of arrow 20, the movement of actuator 130 allows the read/write head on the trailing end of slider 120 to access different data tracks 118 on disk 200.

Figure 2:
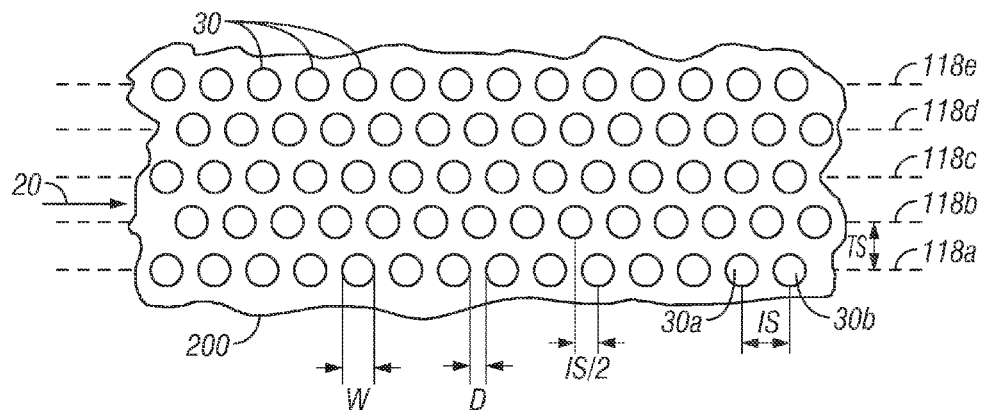
FIG. 2 is a top view of an enlarged portion of a prior art BPM disk showing the detailed arrangement of the data islands.

FIG. 2 is a top view of an enlarged portion of disk 200 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b. Each island has a lateral dimension W parallel to the plane of the disk 200, with W being the diameter if the islands have a circular shape. The islands may have other shapes, for example generally rectangular, oval or elliptical, in which case the dimension W may be considered to be the smallest dimension of the non-circular island, such as the smaller side of a rectangular island. The adjacent islands are separated by nonmagnetic regions or spaces, with the spaces having a lateral dimension D. The value of D may be greater than the value of W.

BPM disks like that shown in FIG. 2 may be perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a non-ferromagnetic material, such as a dielectric, or a material that has no substantial remnant moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 3A:
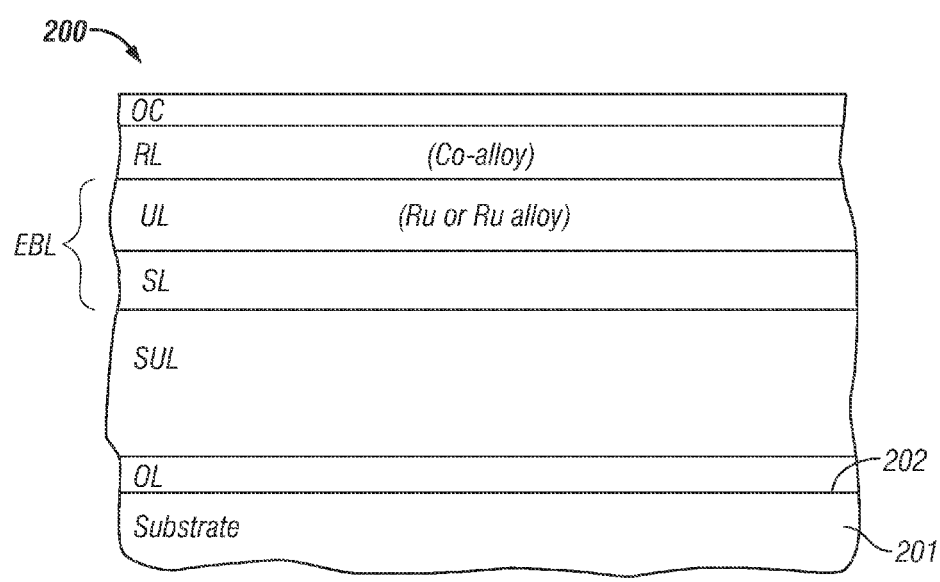

FIG. 3A is a sectional view showing the disk 200 according to the prior art before lithographic patterning and etching to form the BPM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. An adhesion layer or onset layer (OL) for the growth of the SUL may be an AlTi alloy or a similar material with a thickness of about 2-10 nm that is deposited on the substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

The RL in the discrete magnetic islands may be a cobalt (Co) alloy, like a cobalt-platinum (CoPt) or cobalt-platinum-chromium (CoPtCr) alloy. The Co alloy RL is grown on a growth-enhancing underlayer (UL) that induces the crystalline C-axis of the Co alloy to be perpendicular to the plane of the RL, so that the RL has strong perpendicular magnetocrystalline anisotropy. The UL may be a Ru or Ru alloy layer. A seed layer (SL), like a NiW or NiWCr alloy layer, may be deposited on the SUL to enhance the growth of the Ru-containing UL. If the optional SUL is present, then the UL and SL also function as an exchange-break layer (EBL) that breaks the magnetic exchange coupling between the magnetically permeable films of the SUL and the RL.

A protective overcoat (OC) is deposited on the RL. The OC may be sputter-deposited amorphous carbon, like DLC, which may also be hydrogenated and/or nitrogenated. Other materials that may be used for the OC include carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta_2O_5$ and $ZrO_2$—$Y_2O_3$; and mixtures of these materials.

The disk of FIG. 3A is lithographically patterned, for example by a nanoimprinting process. In nanoimprinting, a master template is fabricated, for example by direct e-beam writing, to have the desired pattern of data islands and nonmagnetic regions. A thin film of imprint resist (i.e., a thermoplastic polymer) is spin coated onto the disk. Then the master template with its predefined pattern is brought into contact with the imprint resist film and the template and disk are pressed together and heat is applied. When the imprint resist polymer is heated above its glass transition temperature, the pattern on the template is pressed into the resist film. After cooling, the master template is separated from the disk and the patterned resist is left on the RL. The patterned imprint resist is then used as an etch mask. Reactive-ion-etching (RIE) or ion milling can be used to transfer the pattern in the imprint resist to the underlying disk to form the data islands and nonmagnetic regions.

FIG. 3B is a sectional view of the disk 200 after lithographic patterning and etching. After etching, elevated lands 30 with RL material and grooves or recesses 32 are formed above the substrate surface 202. The typical depth of the recesses 32, which is also essentially the height of the lands 30, is in the range of about 4 to 50 nm and the typical width of the recesses is in the range of about 4 to 50 nm. As shown in FIG. 3B, the etching is preferably performed to a depth that removes all of the RL material so that there is no RL material in the recesses 32. The etching may remove a small amount of the EBL material. Typically there would be a layer of EBL material below the lower surface of the recesses 32.

FIG. 3C is a sectional view of the etched disk 200 of FIG. 3B after deposition of a second optional protective overcoat 34 into the recesses 32 and over the tops of lands 30 and after deposition and chemical-mechanical-polishing (CMP) of fill material 36 in the recesses 32. The optional second protective overcoat 34 may be formed of one of the materials like that used for the OC directly on top of the RL. The fill material 36 may be $SiO_2$ or a polymeric material, or a nonmagnetic metal, like Cu. The CMP results in essentially a planarized disk surface. A layer of conventional liquid lubricant (not shown) may be deposited, for example by spin coating, on the surface of the disk 200.

Figure 4:
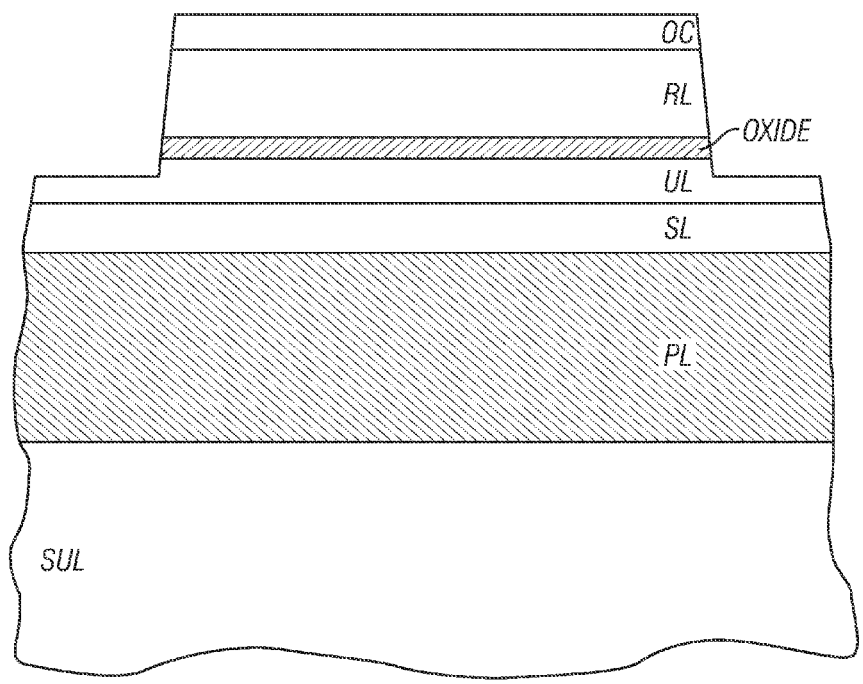
FIG. 4 is a sectional view of a portion of a disk substrate showing a data island with the structure according to the invention.

In the patterned perpendicular media of this invention, the data islands have a planarizing layer (PL) on the substrate and an ultrathin oxide film below the Co-alloy RL. This results in substantially improved homogeneity in the growth of the Co-alloy RL, and a significant reduction in SFD. FIG. 4 is a sectional view of a portion of a disk showing a portion of the SUL with a single data island. The PL is preferably a NiTa alloy, preferably a $Ni_xTa_{100-x}$, where x is in the range of about 50 to 70 atomic percent, with a thickness in the range of about 5 to 40 nm. The seed layer (SL) for the Ru-containing underlayer (UL) is deposited on the PL. The SL is preferably a NiW alloy, preferably $Ni_xW_{100-x}$, where x is in the range of about 80 to 95 atomic percent, with a thickness in the range of about 2 to 20 nm. The UL is deposited on the SL. The UL is preferably Ru, but may be a Ru alloy like RuCr or Ru-doped with oxides such as $Ta_2O_5$, $SiO_2$ or $TiO_2$, with a thickness in the range of about 5 to 30 nm. The RL is a Co alloy, preferably a CoPtCr alloy, with a thickness in the range of about 4 to 15 nm. While granular Co-alloy magnetic layers for conventional continuous magnetic recording disks typically include an oxide, like $SiO_2$, to decrease the grain size, in this invention it is preferable that the Co-alloy RL be oxide-free and has a grain size as large as possible.

In this invention an ultrathin oxide film is deposited on the UL below the RL prior to deposition of the RL. The oxide film is preferably a Ta-oxide, like $Ta_2O_5$, but may also be a Ti-oxide or a Co-oxide, with a thickness in the range of about 0.1 to 1.5 nm. The oxide film is ultrathin, less than or equal to 1.5 nm, and preferably less than or equal to 1.0 nm. In this thickness regime, the thickness may be considered an "average" thickness of a discontinuous film, so that the surface onto which the Co-alloy RL is deposited may be both, the Ru or Ru alloy material of the UL and clusters or regions of the oxide film. The Ta-oxide film may be deposited by sputter deposition from a $Ta_2O_5$ target. If the target is conducting, DC sputtering can be readily employed. On the other hand if the target is an insulator or a high resistance target, RF sputtering is the preferred mode. Alternatively, the $Ta_2O_5$ can be grown in situ by reactive sputtering of Ta with a sputter gas mixture containing the appropriate amount of oxygen.

Figure 5A:
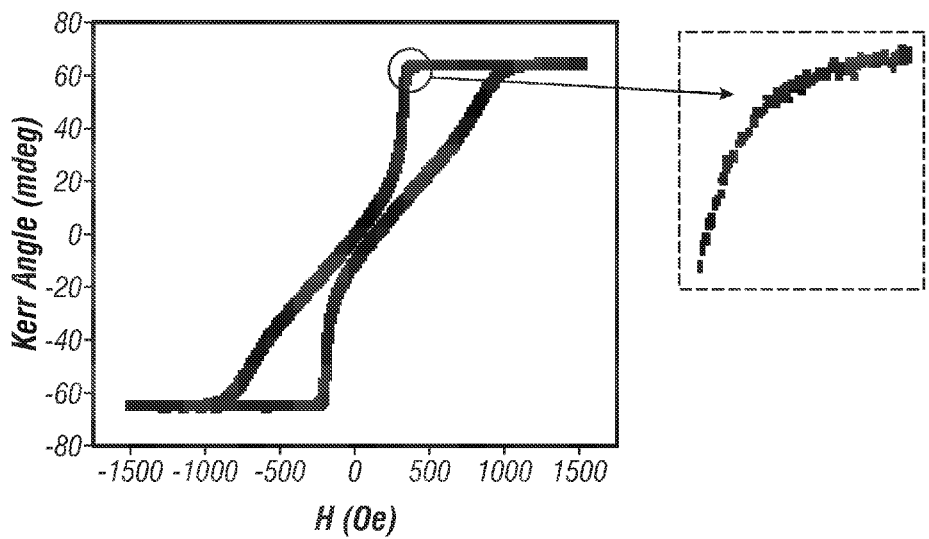
FIGS. 5A-5B show the comparison in magnetic switching for data islands according to the prior art and data islands according to the invention.
Figure 5B:
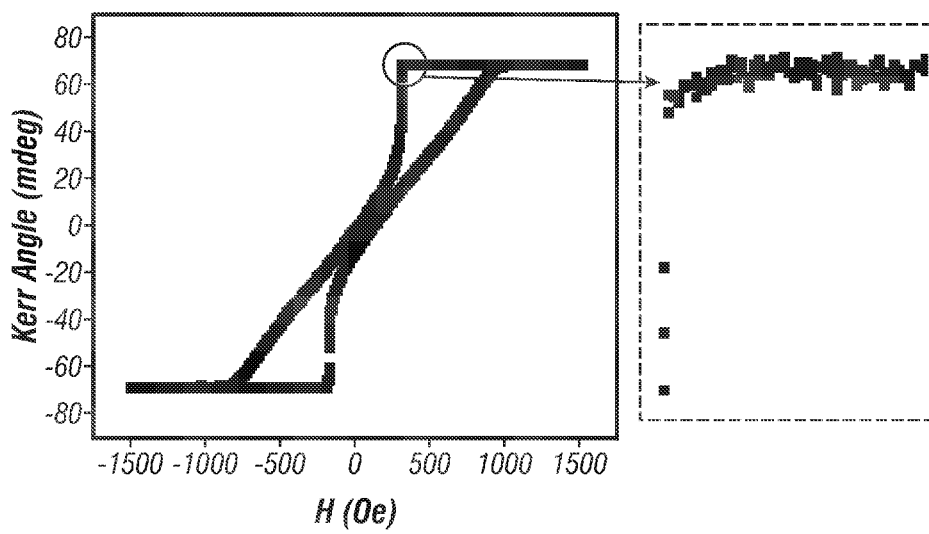

FIGS. 5A-5B show the improvement in magnetic nucleation field for a non-patterned full magnetic film. FIG. 5A shows a Kerr angle hysteresis loop with the circled region expanded to show the full film nucleation field with a structure of [NiTa-5 nm/NiW-8 nm/Ru—10 nm/$Co_{80}Pt_{10}Cr_{10}$-10 nm] on a glass substrate. In the expanded region of FIG. 5B a much sharper nucleation field is shown for the same structure as for FIG. 5A but with a 0.3 nm $Ta_2O_5$ film between the Ru UL and CoPtCr RL. The sharper transition in FIG. 5B is indicative of a narrower range of applied fields needed to nucleate film reversal. In other words, there are less pinning sites such as structural defects in these films that normally hinder reversal and thereby require a wider range of applied fields. This is a result of the growth improvements in the quality of the crystallinity of the CoPtCr alloy when the ultrathin $Ta_2O_5$ film is employed below the RL. The improvement shown in FIG. 5B means that the RL layers, when formed as individual data islands in a BPM, will have better switching properties on account of fewer defects/pinning sites present in the RL alloy. FIG. 5B shows media with sharper transitions compared with FIG. 5A.

Figure 6:
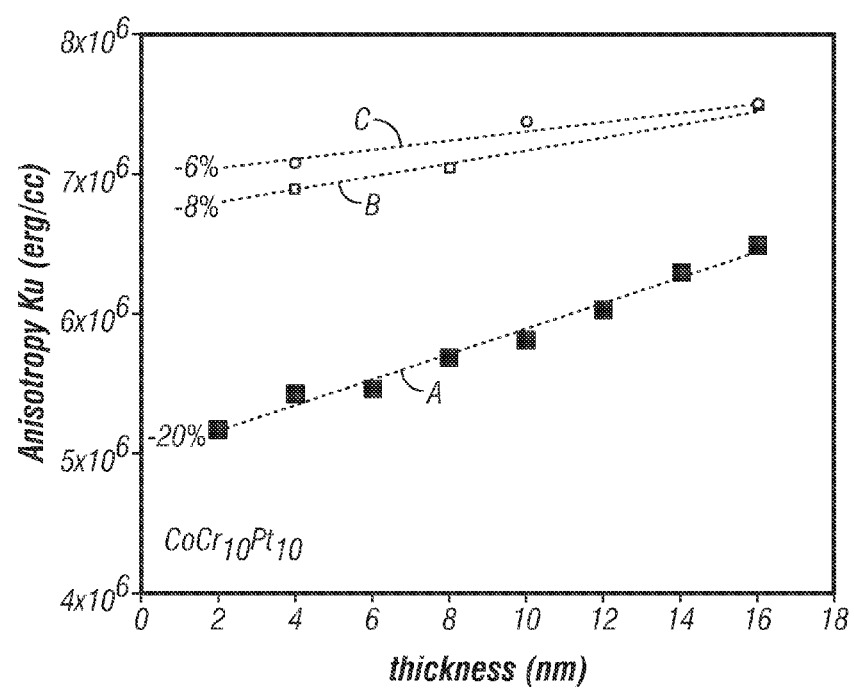
FIG. 6 is a graph of anisotropy ($K_u$) as a function of recording layer thickness for different data islands with a $Co_{80}Pt_{10}Cr_{10}$ recording layer, and shows the improvement in film growth homogeneity for the data islands according to the invention.

FIG. 6 is a graph of the magnetic anisotropy ($K_u$) as a function of RL thickness for different continuous thin film systems with a $Co_{80}Pt_{10}Cr_{10}$ RL, and shows the improvement in film growth homogeneity according to the invention. Curve A is for a thin film with a structure of [Ta—2 nm/NiW—9 nm/Ru—7 nm/$Co_{80}Pt_{10}Cr_{10}$—10 nm] and shows a variation in $K_u$ of about 20% over a RL thickness range of about 2-16 nm. Curve B is for a thin film according to the invention with a structure of [NiTa-5 nm/NiW-8 nm/Ru-10 nm/$Ta_2O_5$—0.3 nm/$Co_{80}Pt_{10}Cr_{10}$—10 nm] and shows a variation in $K_u$ of only about 8% over the same RL thickness range. The oxide film and the replacement of a Ta layer with the NiTa planarizing layer (PL) result in significantly improved homogeneity in the growth of the CoPtCr layer. Curve C is for a thin film according to the invention identical to the structure for Curve B, but wherein the thickness of the NiTa PL is increased from 5 nm to 30 nm. The variation in $K_u$ is reduced from about 8% to about 6% over the same RL thickness range. Thus the film growth homogeneity can be improved with a thicker NiTa PL, preferably a thickness greater than 20 nm for the case where no SUL is employed. When the SUL is present, the thickness of this PL can be significantly reduced to a range of 2 to 10 nm.

As a result of the improved switching quality and film growth homogeneity, a BPM with data islands according to the invention shows significantly reduced SFD. For a BPM with islands having a structure like that for Curve A in FIG. 6, the intrinsic SFD was measured at 630 Oe. For a BPM with islands having a structure according to the invention (like that for Curve B in FIG. 6, the intrinsic SFD was measured at 450 Oe. The intrinsic SFD is measured via the method described by Tagawa et al., "Relationships between high density recording performance and particle coercivity distribution," *IEEE TRANSACTIONS ON MAGNETICS*, VOL. 27, NO. 6, NOVEMBER 1991, 4975-4977.

Perpendicular magnetic recording disks with BPM have been proposed primarily for use in conventional magnetic recording, wherein an inductive write head alone writes data to the islands. However, perpendicular BPM disks have also been proposed for use in heat-assisted recording, also called thermally-assisted recording (TAR). In a TAR system, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the inductive write head. The improved BPM of this invention is also applicable to perpendicular BPM disks for TAR disk drives.

Figure 7:
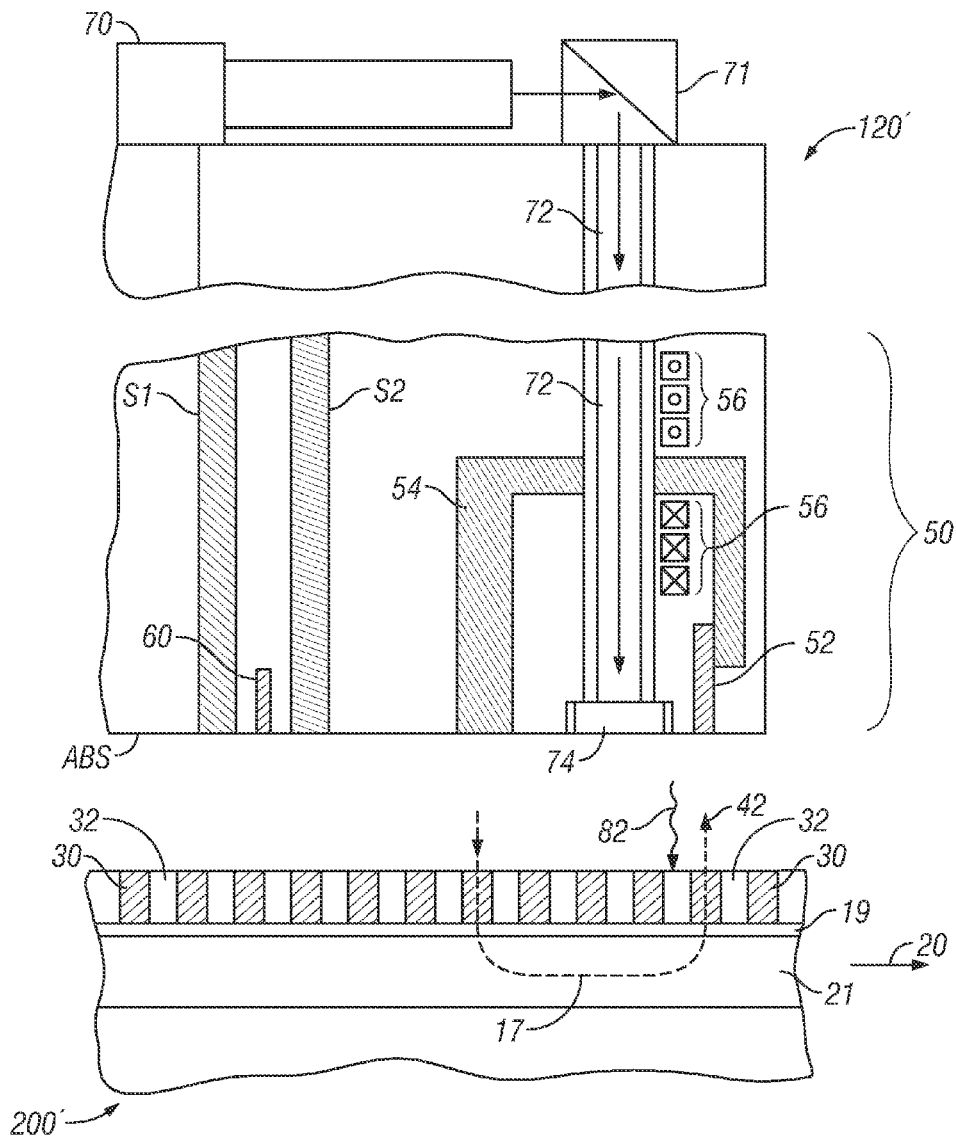
FIG. 7 is a sectional view of an air-bearing slider for use in a thermally-assisted recording (TAR) system and a portion of a TAR disk with data islands according to the invention.

FIG. 1 thus depicts a conventional magnetic recording system with a perpendicular BPM disk 200 and an air-bearing slider 120 that supports the write head and read head. FIG. 7 depicts a sectional view, not drawn to scale because of the difficulty in showing the very small features, of an air-bearing slider 120' for use in a TAR system and a portion of a TAR disk 200'. The air-bearing slider 120' supports the write head 50 (with yoke 54 and write pole 52), read head 60, and shields S1 and S2. In the TAR disk 200', a heat sink layer 21 is located below the islands 30 and nonmagnetic regions 32. The islands 30 may be islands according to this invention, like the island in FIG. 4. Heat sink layer 21 is formed of a material that is a good thermal conductor, like Cu, Au, Ag or other suitable metals or metal alloys. Layer 19 may be a thermal resist layer, such as a layer of MgO or $SiO_2$, between the heat sink layer 21 and the islands 30 to help control the heat flow so that heat is not distributed too rapidly into the heat sink layer 21. The TAR disk 200' may also include an optional SUL, which if present would be located below the heat sink layer 21. If there is no SUL, then there is no need for an EBL. The slider 120' has an air-bearing surface (ABS) that faces the disk 200'. The slider 120' also supports a laser 70, mirror 71, optical waveguide or channel 72 and NFT 74, which has its output at the ABS.

When write-current is directed through coil 56, the write pole 52 directs magnetic flux to the data islands 30, as represented by arrow 80 directed to one of the data islands 30. The dashed line 17 with arrows shows the flux return path back to the return pole 54. The NFT 74 directs near-field radiation, as represented by wavy arrow 82, to the data islands 31 as the TAR disk 10' moves in the direction 23 relative to the slider. The electric charge oscillations in the NFT heat the data islands 30 at the same time the data islands are exposed to the write field from the write pole 52. This raises the temperature of the magnetic recording material in the data islands to near or above its Curie temperature to thereby lower the coercivity of the material and enable the magnetization of the data island to be switched by the write field. When the data islands according to this invention are used in a TAR disk drive, the anisotropy field of the Co-alloy may be between about 15 and 100 kOe, which is considerably higher than the write field from a conventional write head. For example, a high-anisotropy Co-alloy like $Co_{50}Pt_{50}$ with an anisotropy field of 50 kOe may be used. The composition of the Co-alloy layer may be varied to allow tuning of the Curie temperature.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A patterned perpendicular magnetic recording medium comprising:
   a substrate;
   a planarizing layer on the substrate;
   a nonmagnetic Ru-containing underlayer on the planarizing layer;
   a perpendicular magnetic recording layer of an alloy comprising cobalt and platinum; and
   an oxide film between the Ru-containing layer and the magnetic recording layer and having a thickness less than 1.5 nm; and
   wherein the magnetic recording layer is patterned into a plurality of discrete islands.

2. The medium of claim 1 wherein the oxide film comprises an oxide selected from a Ta-oxide, a Co-oxide and a Ti-oxide.

3. The medium of claim 1 wherein the oxide film is a discontinuous film of oxide clusters on the Ru-containing layer, whereby the magnetic recording layer is in contact with the Ru-containing layer and the oxide clusters.

4. The medium of claim 1 wherein the planarizing layer comprises an alloy comprising Ni and Ta.

5. The medium of claim 4 wherein the NiTa alloy planarizing layer has a thickness greater than 20 nm.

6. The medium of claim 1 further comprising a NiW alloy seed layer on the planarizing layer below and in contact with the Ru-containing underlayer.

7. The medium of claim 1 wherein the magnetic recording layer alloy is an oxide-free alloy.

8. The medium of claim 1 wherein the magnetic recording layer alloy further comprises Cr.

9. The medium of claim 1 further comprising a soft underlayer (SUL) of soft magnetically permeable material on the substrate below the planarizing layer.

10. The medium of claim 9 wherein the planarizing layer comprises an alloy comprising Ni and Ta having a thickness greater than or equal to 2 nm and less than or equal to 10 nm.

11. The medium of claim 9 wherein the SUL is formed of a material selected from the group consisting of alloys of CoFe, CoNiFe, NiFe, FeCoB, CoCuFe, FeAlSi, FeTaN, FeN, FeTaC, CoTaZr and CoZrNb.

12. The medium of claim 9 wherein the SUL is a lamination of multiple magnetically permeable films separated by nonmagnetic films.

13. The medium of claim 12 wherein the nonmagnetic films in the lamination provide antiferromagnetic coupling of the magnetically permeable films in the lamination.

14. The medium of claim 1 wherein the medium is a magnetic recording disk and wherein the islands are arranged on the substrate in a plurality of generally concentric circular tracks.

15. A magnetic recording disk drive comprising:
   the disk of claim 14;
   a write head for magnetizing the perpendicular magnetic recording layer in the islands; and
   a read head for reading the magnetized recording layer in the islands.

16. A thermally-assisted recording (TAR) magnetic recording disk drive comprising:
   the disk of claim 14 further comprising a heat sink layer between the substrate and the islands;
   a write head for applying a magnetic field to the perpendicular magnetic recording layer in the islands;
   an optical data channel and near-field transducer for directing radiation to the islands to heat the perpendicular magnetic recording layer in the islands; and a read head for reading the magnetized recording layer in the islands.

17. A patterned perpendicular magnetic recording disk comprising:

a substrate;

a planarizing layer comprising an alloy comprising Ni and Ta on the substrate;

a nonmagnetic Ru-containing underlayer on the planarizing layer;

a perpendicular magnetic recording layer of an oxide-free alloy comprising cobalt and platinum; and an oxide film between the Ru-containing layer and the magnetic recording layer, the oxide film comprising an oxide selected from a Ta-oxide, a Co-oxide and a Ti-oxide and having a thickness less than or equal to 1.5 nm; and wherein the perpendicular magnetic recording layer is patterned into a plurality of discrete islands arranged in a plurality of concentric tracks.

18. The disk of claim 17 wherein the oxide film is a discontinuous film of oxide clusters on the Ru-containing layer, whereby the magnetic recording layer is in contact with the Ru-containing layer and the oxide clusters.

19. The disk of claim 17 further comprising a NiW alloy seed layer on the planarizing layer below and in contact with the Ru-containing underlayer.

20. The disk of claim 17 wherein the NiTa alloy planarizing layer has a thickness greater than 20 nm.

21. The disk of claim 17 further comprising a soft underlayer (SUL) of soft magnetically permeable material on the substrate below the planarizing layer, and wherein the NiTa alloy planarizing layer has a thickness greater than or equal to 2 nm and less than or equal to 10 nm.

* * * * *